United States Patent Office

3,243,262
Patented Mar. 29, 1966

3,243,262
PROCESS FOR PREPARING MICROSPHEROIDAL
SILICA
Brownell Carr, Wyoming, Ohio, and Hanson L. Guidry
and James R. Hyde, Cincinnati, Ohio, assignors to
W. R. Grace & Co., New York, N.Y., a corporation of
Connecticut
No Drawing. Filed Feb. 18, 1963, Ser. No. 259,414
5 Claims. (Cl. 23—182)

This invention relates to a process for preparing a microspheroidal high surface area silica having a high pore volume.

It is known that almost all solids are capable of adsorbing gas, vapors or liquids on their surfaces to some degree and that the amount adsorbed depends on the nature and extent of the surface. One of the better known adsorbents is commercial silica gel which contains an extensive lattice of void spaces which permit the adsorption of approximately 50% of its weight of water from saturated air. From this, it has been estimated that one cubic inch of silica gel contains pores having a surface area of about 50,000 square feet. With this enormous internal surface and infinite number of small diameter capillaries, silica gel attracts vapors, condenses them and holds them as liquids. The same physical phenomenon applies to the adsorption of liquids per se.

The silica gels are normally prepared by the preparation of a sodium silicate solution followed by treatment of the silicate solution to completely neutralize the sodium hydroxide. This process prepares a hydrosol, which upon standing, forms a hydrogel. The hydrogel, on aging, undergoes syneresis. This phenomenon shrinks the gel. The onset of syneresis can easily be detected in a silica gel by the appearance of droplets of water on the surface of the gel.

After the onset of syneresis, the next step in the preparation of silica gel is washing. The method of washing the gel depends on the type of gel to be recovered as the product. If a "regular density" gel is to be recovered, the gel is washed with dilute sulfuric acid to remove the sodium as sodium sulfate. After the washing is complete, the gel is dried. The silica gel prepared according to this process normally has a surface area of about 800 m.$^2$/g. and a pore volume of 0.3 to 0.4 ml./g.

If a silica gel product is desired having a surface area of about 300 to 500 m.$^2$/g., the gel is washed with an ammonia solution at the onset of syneresis. The product recovered from this treatment has a surface area of about 300 to 500 m.$^2$/g. and a pore volume of 0.65 to 1.0 ml./g. If the surface area of the product is to be in the 500 to 800 m.$^2$/g. range, the gel is washed with water at the onset of syneresis. The product recovered has a pore volume of about 0.35 to about 0.65 ml./g.

We have found a method of preparing a microspheroidal silica which, although it has the same composition as commercial silica gel, is a highly porous silica. The surface area of our product is on the order of 300 to 1000 m.$^2$/g. The pore volume of our product does not decrease with increasing surface area as is characteristic of the silica gel prepared according to the prior art techniques. In addition to this phenomenon, our product is also distinguished from the silica gel product of the prior art by the fact that it is microspheroidal in form.

Several uses can be suggested for a product having the properties of the product covered in the process of the instant application. The product of our invention is of particular interest as a catalyst base. It has been found especially useful in the preparation of polymerization catalysts.

Silica gel of the prior art, although it has a surface area in the range necessary for the preparation of a catalyst base, is deficient in that the pore volume of the product characteristically decreases with an increase in surface area. It is therefore a primary object of this invention to provide a finely divided, colorless, porous silica in microspheroidal form having a surface area of about 300 to 1000 m.$^2$/g. and a pore volume of about 0.5 to about 1.25 cc./g.

We have found that silica having surface areas of 310 to 1000 m.$^2$/g. in the pore volume range of 0.5 to 1.25 cc./g. can be manufactured in a novel process which is both convenient and economical. In essence, our novel process comprises the steps of diluting a sodium silicate solution to the desired silica content and contacting the silicate with $CO_2$ gas to form a silica gel. After the silica gel is prepared, it is aged at an increased temperature for a time sufficient to produce the silica with the desired characteristics. At the end of the aging time, the gel is treated with a strong mineral acid and spray dried. The spray dried material is then washed to remove impurities and dried to recover the product.

In the first step of our process, the sodium silicate solution containing about 28% silica is diluted to the proper silica level of 3–8% $SiO_2$. Satisfactory results are obtained with the silica level between 4.5 and 5.5. We have found that particularly good results are obtained when the silica level is between 5.0 and 5.5. The diluted silicate is then mixed or contacted with carbon dioxide gas to cause it to gel. The silica, before treatment, will have a high pH which is reduced to a pH of about 9.8 to 10.2 by the $CO_2$ gelation.

The next step of our process is the critical aging step. The materials with the pore volume and surface area in the desired range can be prepared by aging the gel at a temperature of about 100 to 120° F. for a period of about 30 minutes to 2 hours. Particularly good results are obtained when the gel is aged at a temperature of about 118° F. for a period of about 75 to 90 minutes. The aging time and temperature are critical in that they control the pore volume, and to a lesser extent, the surface area of the final product. If a product with a pore volume in the lower part of the range is desired, the gel is aged at a temperature in the lower end of the range, about 100° F., for a period of about 30 minutes. However, if a product with a pore volume in the range of about 1.0 to 1:15 cc./g. is desired, the gel is aged at a temperature of about 118° F. for a period of about 90 minutes.

After the gel is suitably aged it is treated with a strong mineral acid. Any of the strong mineral acids, such as, for example, the group including hydrochloric acid and sulfuric acid, can be used. For purposes of simplicity, we will describe our process using sulfuric acid. The gel is acidified with an acid in the concentration of about 35 to about 50%, preferably about 40%. The duration of the acid treatment and the quantity of acid to be used is governed by the desired pH of the treated slurry. The characteristics of the product greatly depend on the control of this particular factor. The pH should be kept within the range of about 4.5 to about 8. We have found that a gel with a surface area of about 600 m.$^2$/g. and a pore volume of about 1.0 cc./g. can be prepared by acidifying the slurry to a pH of about 4.7.

In the next step of our process, the aged, acidified silica gel is spray dried. We have found that the material may be filtered before it is spray dried, however, no quality advantage is derived from the filtration and the material can be spray dried directly. After the product is spray dried, it is washed with a dilute acid. This washing is carried out with a dilute mineral acid in the concentration range of 0.5 to about 2° Bé., preferably about 1° Bé. acid. The acid wash is carried out at an elevated temperature, preferably about 125 to 140° F. Particularly satisfactory results are obtained when the material is washed with 1° Bé. sulfuric acid at a temperature of 130° F. After the acid wash, the product is washed with decationized water. The final product has a sodium content of less than 0.05% $Na_2O$ and a sulfate of less than 0.5%. After the material is washed, it is dried at a temperature of about 250–400° F. Drying at a lower or higher temperature can be used providing the time of drying is adjusted so that the final product has a total volatiles content of about 5 to 15%.

The product of our invention is very useful as a base in the preparation of a catalyst. Particularly desirable results are obtained when the material is used as a base for a chrome impregnated catalyst used in the polymerization of olefins. Such a catalyst can be prepared by impregnating the material with chromic acid. In this process, the chromic acid is dissolved in a suitable quantity of water and added to the base incrementally with thorough mixing. After the base is impregnated, it is dried at a temperature of about 250 to 275° F. and is then ready for use. The catalyst prepared according to this process contains about 1 to 5% chromium oxides as $CrO_3$ and $Cr_2O_3$.

The invention is further illustrated by the following specific but non-limiting examples.

EXAMPLE I

A six gallon quantity of a sodium silicate solution was diluted to 5.5% $SiO_2$ and was heated to a temperature of 100° F. Gaseous carbon dioxide was then injected into the dilute silicate solution until gelation occurred. The gel was aged for 90 minutes at 120° F. At the end of this time, 1050 ml. of a 40% sulfuric acid solution was added over a period of 15 to 20 minutes with continuous agitation. After the acid addition was complete, the pH of the slurry was 4.7. The acidified slurry was aged for 20 minutes and spray dried. The spray dried product was washed with 1° Bé. sulfuric acid which had been heated to 130° F. followed by a wash with decationized water heated to 130° F.

In each of these washes, the volume of wash liquid was 15 times the volume of product. The product was then transferred to a tray and dried at a temperature of 250–275° F. in an oven heated by steam coils.

The product was analyzed for $Na_2O$ and sulfate ion using standard analytical procedures. The product was activated by heating for 3 hours at 1000° F. The surface area was determined using the well known Brunauer-Emmett-Teller method. The water pore volume was determined using standard techniques, as described in Analytical Chemistry, Innes, W. B. (28, 332–4, 1956). In spray drying the product, the material to be dried was sprayed as a fine mist into a drying chamber heated by a suitable means, such as the combustion of propane. The mist was introduced into the top of the spray dryer where it contacted a countercurrent flow of hot gases in its downward flight and settled at the bottom as solid, dry spheroidal particles of substantially uniform size and shape. Control of particle size may be effected by controlling the characteristics of both the nozzle of the spraying device and the slurry being dried. For instance, the pressure applied in introducing the slurry through the spray nozzle, its viscosity, temperature and composition will influence the particle size. Likewise, the type of nozzle or its specific construction also affects the particle size. The resulting particles are small and are of sufficient hardness so that the rate of fall is of such gentle nature that very little fracture occurs when they reach the bottom of the dryer. Examination of the collected spray dried particles revealed that the shape was substantially microspheroidal with less than 1% of the particles being irregularly shaped. The spray dryer was operated at an inlet temperature of about 900° F. and an outlet temperature of about 300–350° F. The results obtained in duplicate runs are set out in Table I below:

*Table I*

| | | |
|---|---|---|
| Surface Area in m.²/g | 600 | 649 |
| Pore Volume (water) in cc./g | 1.00 | 1.01 |
| $Na_2O$ in percent | 0.018 | |
| $SO_4$ in percent | 0.11 | |

EXAMPLE II

The effect of the aging time of the gelled silicate on the characteristics of the product was determined in a run in which the gelled silicate was aged for a period of 30 minutes rather than 90 minutes as in Example I.

In this run, 8 gallons of a silicate solution which had been previously diluted to an $SiO_2$ content of 5.5% using the techniques described in Example I was heated to 100° F. Gaseous carbon dioxide was then injected into the dilute silicate until gelation occurred. The gel was permitted to age 30 minutes. At the end of this period, the pH of the gel was 10.0. After aging, a total of 1675 ml. of a 40% sulfuric acid was added over a period of 10–15 minutes. The gel and acid mixture were thoroughly stirred. The pH at the end of the acid addition was 4.7. The slurry was then spray dried and washed using the techniques described in Example I. An analysis of the product recovered in this run is set out in Table II below:

*Table II*

| | |
|---|---|
| Surface area in m.²/g. | 781 |
| Pore volume (water) in cc./g. | 0.55 |
| $Na_2O$ in percent | 0.021 |
| $SO_4$ in percent | 0.05 |
| $Al_2O_3$ | 0.18 |

It is apparent from a comparison of the data presented in Table I with the data presented in Table II that aging the gelled silicate for a shorter period of time results in a product with a smaller pore volume. The pore volume of the product which had been aged for a period of 90 minutes was above 1.00 cc./g. The pore volume of the product which was aged for only 30 minutes was only 0.55 cc./g.

EXAMPLE III

The effect of adding acid before the termination of aging time was determined in a run in which the acid was added to the material after a period of 20 minutes, and the acidified gel aged for an additional 70 minutes.

In this run, a silica gel containing 5.2% $SiO_2$ was aged for 20 minutes and then treated with 40% sulfuric acid solution as in Example I. The acidified gel was aged for an additional 70 minutes at a temperature of 118° F. The acid was added to bring the pH of the acidified gel to 4.7. The product was then spray dried, washed and redried using the techniques described in Example I. The data collected in this run compared with the data collected in Examples I and II is presented in Table III below:

*Table III*

| Product of | Example I | Example II | Example III |
|---|---|---|---|
| Surface area in m.²/g | 660 | 781 | 734 |
| Pore volume (water) cc./g | 1.00 | 0.55 | 0.82 |

It is apparent from an examination of these data that the addition of sulfuric acid before the 90 minute aging time is completed results in a product with a smaller pore volume than is obtained when the gelled silicate is allowed to age for the full period of 90 minutes at a temperature of 118° F. A comparison of the data collected in Example II with the data collected in Example III shows that although the pore volume growth is inhibited by the addition of acid, it is not completely stopped as is the case when the gel is aged for a period of only 30 minutes prior to acid treatment and spray drying.

EXAMPLE IV

The effect of acid concentration on the surface area was determined in a run in which the conditions were essentially the same with the exception of the variation in the amount of acid used to treat the gelled silicate.

In each of these runs, a silica solution was diluted to contain 5.2% silica and gelled with $CO_2$ as described in Example I. The gelled silicate was aged for 75 minutes at a temperature of about 112° F. The acid was added in one case until the pH of the acidified slurry was 7.0 and in the other case, the pH of the acidified slurry was decreased to 4.7. The results collected in this run are set out in Table IV below:

Table IV

| | | |
|---|---|---|
| pH of acidified slurry | 7.0 | 4.7 |
| Surface area (m.²/g.) | 633 | 739 |
| Pore volume (cc./g.) | 0.89 | 0.90 |

These data show conclusively that increasing the amount of acid used to treat the gelled silicate definitely increases the surface area of the product. In this run, the surface area increased from 633 to 739 on an increase in the amount of acid used from the amount required to give an acidification pH of 7.0 to 4.7. The pore volume of the product was essentially the same. The magnitude of this effect was also demonstrated in a series of runs in which the amount of acid used was varied over a wider range. In this series of runs, the acidification pH's were 8.0, 6.5 and 4.7 respectively. The runs were all made using a gel containing 5.2% $SiO_2$ which was aged for 90 minutes at a temperature of 118° F. The data collected in this series is set out in Table V below:

Table V

| | | | |
|---|---|---|---|
| pH of acid treated gel | 4.7 | 6.5 | 8.0 |
| Surface area in m.²/g | 714 | 656 | 614 |
| Pore volume in cc./g | 1.05 | 1.00 | 1.03 |

The relationship between the acid concentration and the surface area is shown very graphically in this series of runs. The pore volume in each case is essentially the same. However, the surface areas are varied from a surface area of 714 m.²/g. where the acid was added to an acidification pH of 4.7 to 614 m.²/g. where a smaller amount of acid was used and the acidification pH was 8.0.

EXAMPLE V

The effect of filtering the acidified particles before spray drying was investigated in runs in which the conditions were kept constant with the exception that in one case the product was filtered before being spray dried and in the other case it was spray dried directly. In each of these runs the silica content of the gel was 5.2% and the gel was aged for a period of 90 minutes at a temperature of 118° F. and acidified to a pH of 4.7. The data collected is set out in Table VI below:

Table VI

| Spray dried | Without Filtration | After Filtration |
|---|---|---|
| Surface area in m.²/g | 660 | 624 |
| Pore volume in cc./g | 1.00 | 1.15 |

These data show there is no particular advantage to be gained in either pore volume or surface area characteristics by filtering the product before spray drying.

It is apparent from a review of the data presented in the above examples that characteristics of the product recovered can be controlled by control of pH. The data show clearly that a product with a desired surface area can be prepared by use of the correct amount of acid. The acidification of the gelled silicate to a lower pH gives a higher surface area for any given pore volume. Another important factor is the aging time before acid addition. If the material is aged at a low pH, that is, in the range of 4.7 to 6.0, the pore volume growth is essentially stopped. However, at higher pH, the pore volume growth may continue.

EXAMPLE VI

A higher pore volume product is prepared using the following techniques.

A sodium silicate solution is diluted to contain about 5% $SiO_2$. The diluted silicate is gelled with carbon dioxide using the techniques described in Example I. The gelled silicate is heated to a temperature of about 130° F. and aged for about 30 minutes at this temperature. After the aging is complete the pH of the gel is carefully reduced to about 4.5 by the cautious addition of 40% sulfuric acid. The product is allowed to further age for 90 to 100 minutes and then spray dried. The product is washed and dried using the techniques described in Example I. The product will have a surface area of about 850 m.²/g. and a pore volume of about 0.90 cc./g.

EXAMPLE VII

This example illustrates the method of preparing the catalyst suitable for polymerization of olefins.

A quantity of sodium silicate solution was diluted to a 5.2% $SiO_2$, and aged 90 minutes at 180° F. after being treated with carbon dioxide to gel the silica. The aged gel was acidified with 40% sulfuric acid in a quantity sufficient to prepare a slurry pH of 4.7. The product was spray dried directly without filtration. The spray dried material was washed with 1° Bé. sulfuric acid which had been heated to 130° F. followed by a wash with decationized water. The decationized water is essentially a water which has been treated to remove $Na^+$ ions, $K^+$ ions, etc. This washing decreased the $Na_2O$ content to less than 0.05 and the sulfate content to less than 0.5. The product was washed with 15 volumes of wash water to 1 volume of product.

After the material was washed it was dried at 400° F. to a total volatiles content of 23.14%. The material had the following characteristics:

| | |
|---|---|
| Surface area _____m²./g__ | 674 |
| Pore volume _____cc./g__ | 1.04 |
| $Na_2O$ _____percent__ | 0.018 |
| Sulfate _____do____ | <0.01 |

A total of 1360 grams of this material was impregnated with 13.8 grams of chromic acid which had been previously dissolved in 850 ml. of distilled water. The impregnation was made by incremental addition in three 284 ml. batches. The impregnating solution was mixed thoroughly with the base between each addition. The product was dried on a flat tray at 250–275° F. in an oven heated with steam coils. The final catalyst had the following analysis:

| | Percent |
|---|---|
| $Na_2O$ | 0.036 |
| $CrO_3$ | 1.09 |
| $H_2O$ | 6.47 |
| Total volatiles | 6.70 |

The product was heated for 3 hours at 1000° F. and the pore volume and surface area determined. The product had a surface area of 630 m.²/g. and a pore volume of 0.99 cc./g.

Obviously many modifications and variations of the invention as hereinabove set forth may be made without departing from the essence and scope thereof and only

What is claimed is:

1. A process for preparing microspheroidal silica having a surface area of about 300 to 1000 m.$^2$/g. and a pore volume of about 0.5 to 1.25 cc./g., which comprises
   (a) diluting a sodium silicate solution to a silica content of about 3 to 8%,
   (b) reacting the silicate in the solution with carbon dioxide to form a silica gel,
   (c) aging the gelled silicate in the reaction mixture at a temperature of at least 100° F. for a period of about 30 minutes to 2 hours,
   (d) adding sulfuric acid to the reaction mixture containing the aged silica gel in a quantity sufficient to adjust the pH to about 4.5 to 8.0,
   (e) spray drying the reaction mixture,
   (f) washing to remove soluble impurities,
   (g) and drying and recovering the product silica.

2. The process of claim 1 wherein the spray-dried gel is washed with a dilute acid followed by a water wash.

3. The process of claim 2 wherein the silica gel is aged at a temperature of from about 100° F. to 120° F., the spray-dried gel is washed with dilute sulfuric acid, and the washed gel is dried at a temperature of from 250 to 400° F. to form the silica product.

4. The process of claim 3 wherein the sodium silicate solution is diluted to a silica content of from 4.5 to 5.5% and heated to a temperature of from about 100 to 120° F. before being contacted with carbon dioxide.

5. The process of claim 3 wherein the sodium silicate solution is diluted to a silica content of from 4.5 to 5.5%, the silica gel is aged at a temperature of about 118° F. for a period of from 75 to 90 minutes, the pH of the aged gel is adjusted with a 35 to 50% sulfuric acid solution, the spray-dried gel is washed with 0.5 to 2.0° Bé. sulfuric acid followed by a wash with decationized water, and the washed gel is dried at a temperature of about 400° F.

References Cited by the Examiner

UNITED STATES PATENTS

| | | | |
|---|---|---|---|
| 2,735,801 | 2/1956 | Gutzeit | 252—458 |
| 2,805,955 | 9/1957 | Allen | 23—182 |
| 2,940,830 | 6/1960 | Thornhill | 23—182 |
| 3,066,092 | 11/1962 | Winyall | 252—453 |

OSCAR R. VERTIZ, *Primary Examiner.*

MAURICE A. BRINDISI, *Examiner.*

R. D. EDMONDS, H. S. MILLER, R. M. DAVIDSON,
*Assistant Examiners.*